(12) United States Patent
Pike et al.

(10) Patent No.: US 11,951,409 B2
(45) Date of Patent: Apr. 9, 2024

(54) ROLLING VEHICLE TRACK

(71) Applicant: Great Coasters International, Inc., Sunbury, PA (US)

(72) Inventors: Jeff Pike, Union, KY (US); Dustin Kyle Sloane, Orlando, FL (US)

(73) Assignee: Great Coasters, Inc., Sunbury, PA (US)

( * ) Notice: Subject to any disclaimer, the term of this patent is extended or adjusted under 35 U.S.C. 154(b) by 857 days.

(21) Appl. No.: 17/022,559

(22) Filed: Sep. 16, 2020

(65) Prior Publication Data

US 2021/0077913 A1   Mar. 18, 2021

Related U.S. Application Data

(60) Provisional application No. 62/901,006, filed on Sep. 16, 2019.

(51) Int. Cl.
*A63G 7/00* (2006.01)
*B29C 65/56* (2006.01)
*E01B 25/00* (2006.01)

(52) U.S. Cl.
CPC .............. *A63G 7/00* (2013.01); *B29C 65/562* (2013.01); *E01B 25/00* (2013.01); *E01B 2201/04* (2013.01)

(58) Field of Classification Search
CPC .......... A63G 7/00; A63G 21/00; A63G 21/04; B29C 65/562; E01B 25/00; E01B 2201/04
See application file for complete search history.

(56) References Cited

U.S. PATENT DOCUMENTS

| | | |
|---|---|---|
| 2,923,254 A | 2/1960 | Barthelmess |
| 3,225,703 A | 12/1965 | Lemcke |
| 3,889,605 A | 6/1975 | Bacon |
| 4,208,969 A | 6/1980 | Baltensperger et al. |
| 4,274,336 A | 6/1981 | Pater et al. |
| 4,304,187 A | 12/1981 | Becker et al. |
| 6,402,624 B1 | 6/2002 | Larson et al. |
| 7,347,321 B1 | 3/2008 | Sakai |
| 7,845,285 B2 | 12/2010 | Hast |
| 7,980,181 B2 | 7/2011 | Heaslip et al. |

(Continued)

FOREIGN PATENT DOCUMENTS

| | | |
|---|---|---|
| CN | 1730818 A | 2/2006 |
| GB | 726161 A | 3/1955 |

(Continued)

*Primary Examiner* — Robert J McCarry, Jr.
(74) *Attorney, Agent, or Firm* — McNees Wallace & Nurick

(57) ABSTRACT

A rolling vehicle track including a first wall and a second wall each positioned between and connected to a third wall and a fourth wall. The track further includes a bracket having a first bracket portion, a second bracket portion, a third bracket portion, and a fourth bracket portion, the first bracket portion connected to the third wall, and the fourth bracket portion connected to the first wall. The track further includes the first wall, the second wall, the third wall, and the fourth wall defining a first quadrilateral chamber. The track further includes the first bracket portion, the second bracket portion, the third bracket portion, and the first wall defining a second quadrilateral chamber, the first wall, the second wall, the third wall, the fourth wall, and the bracket are interconnected without welding.

24 Claims, 19 Drawing Sheets

(56) References Cited

U.S. PATENT DOCUMENTS

| | | |
|---|---|---|
| 8,215,041 B2 | 7/2012 | Hill |
| 8,590,455 B2 | 11/2013 | Schilke et al. |
| 9,566,527 B2 | 2/2017 | Schilke et al. |
| 9,821,490 B2 * | 11/2017 | Schilke .................... B27M 3/00 |
| 10,369,720 B2 | 8/2019 | Schilke et al. |
| 2008/0226846 A1 | 9/2008 | Hill |

FOREIGN PATENT DOCUMENTS

| | | | |
|---|---|---|---|
| GB | 2190611 | A | 11/1987 |
| JP | 56158273 | A | 12/1981 |
| JP | 3589588 | B2 | 11/2004 |
| WO | 2005110157 | A1 | 11/2005 |
| WO | 2006129118 | A1 | 12/2006 |
| WO | 2011032115 | A1 | 3/2011 |

\* cited by examiner

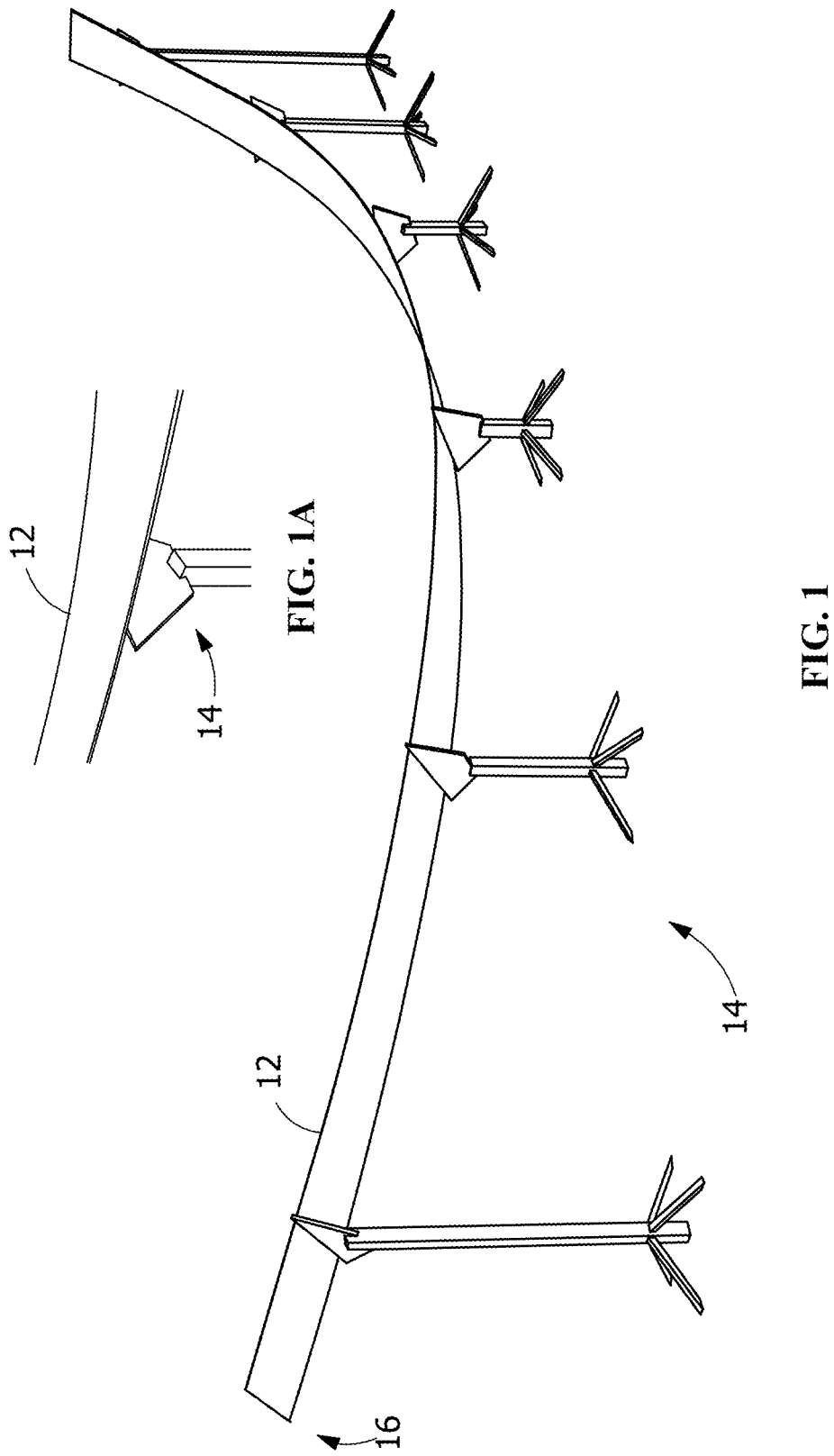

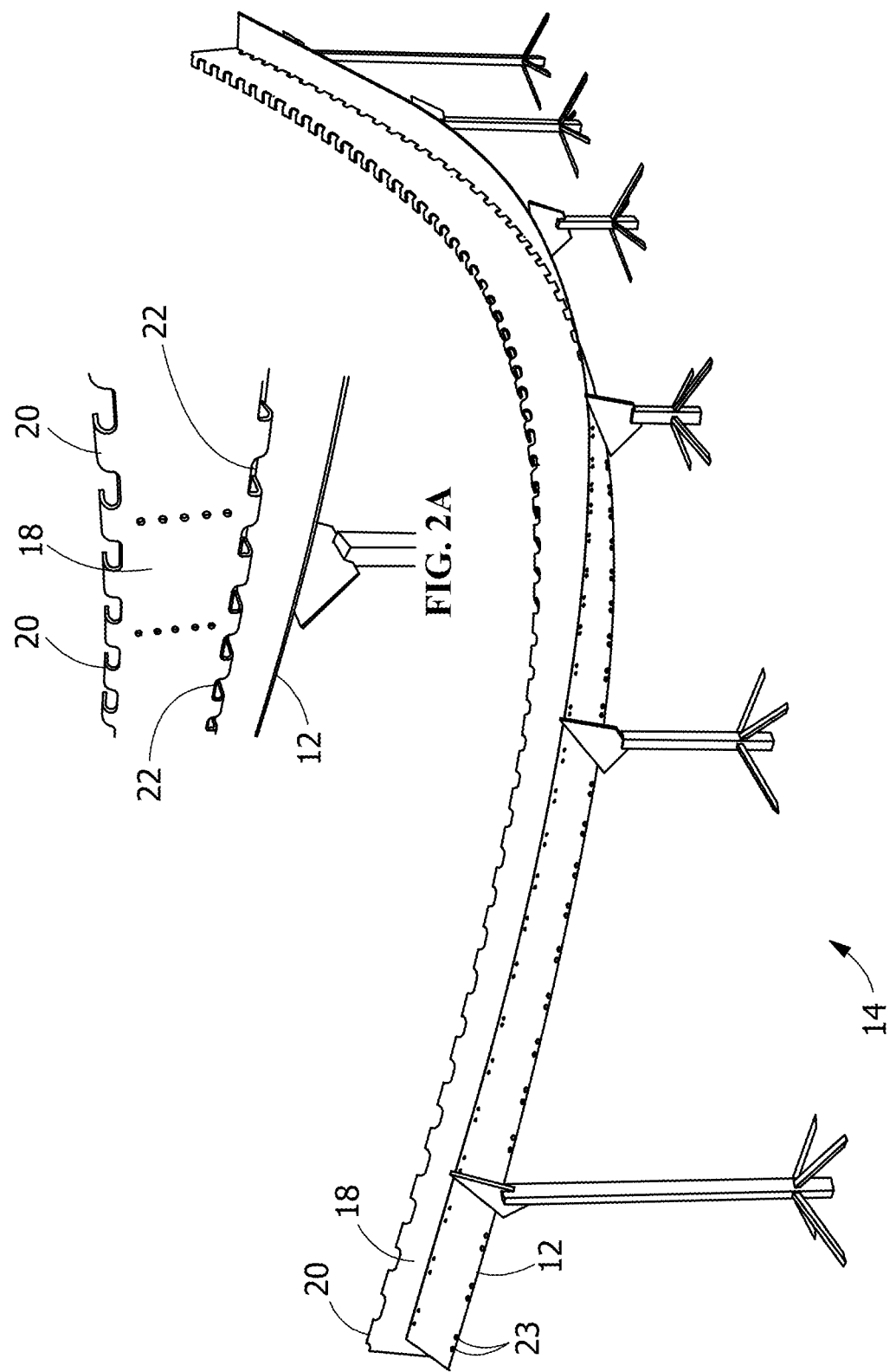

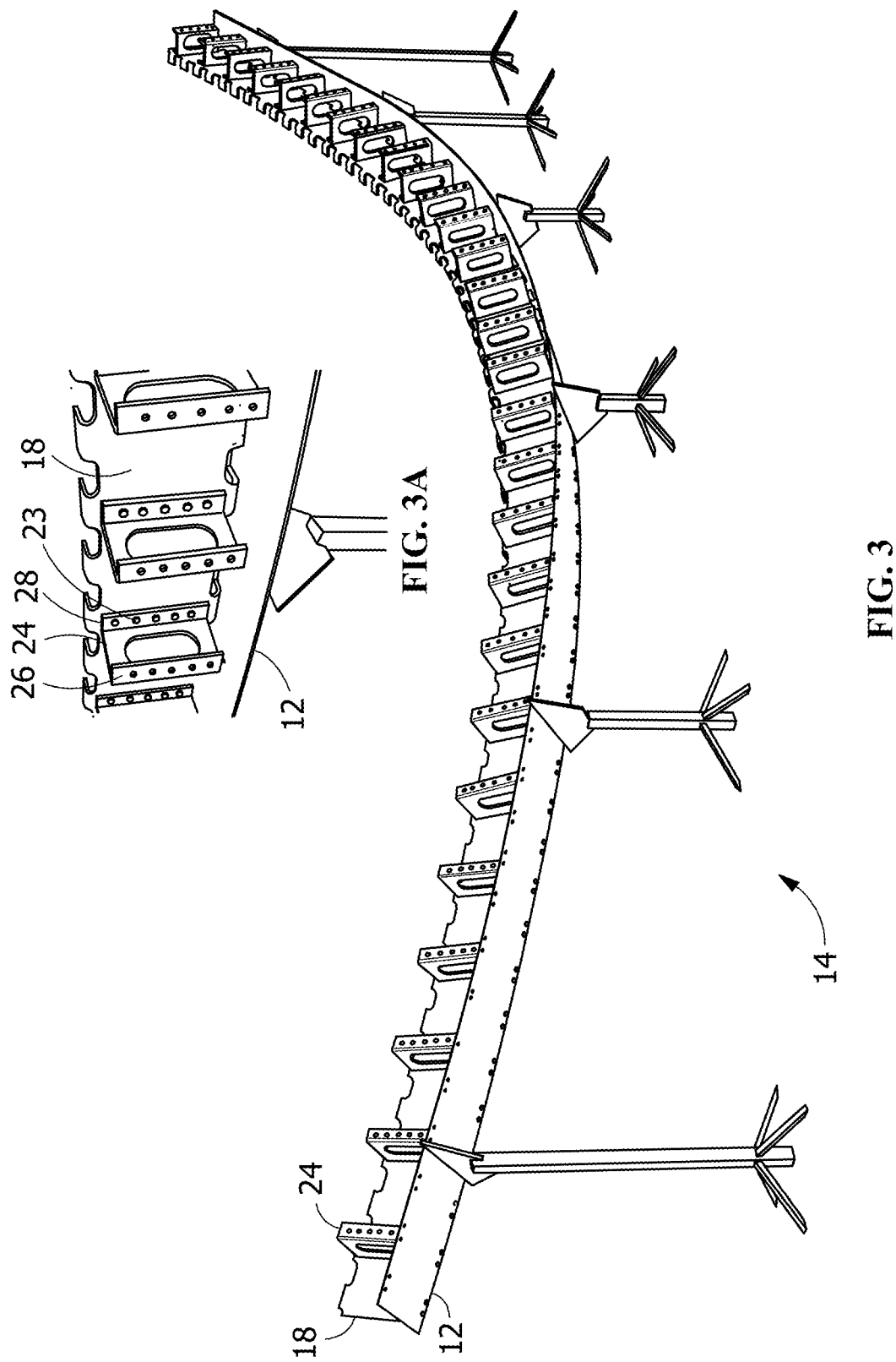

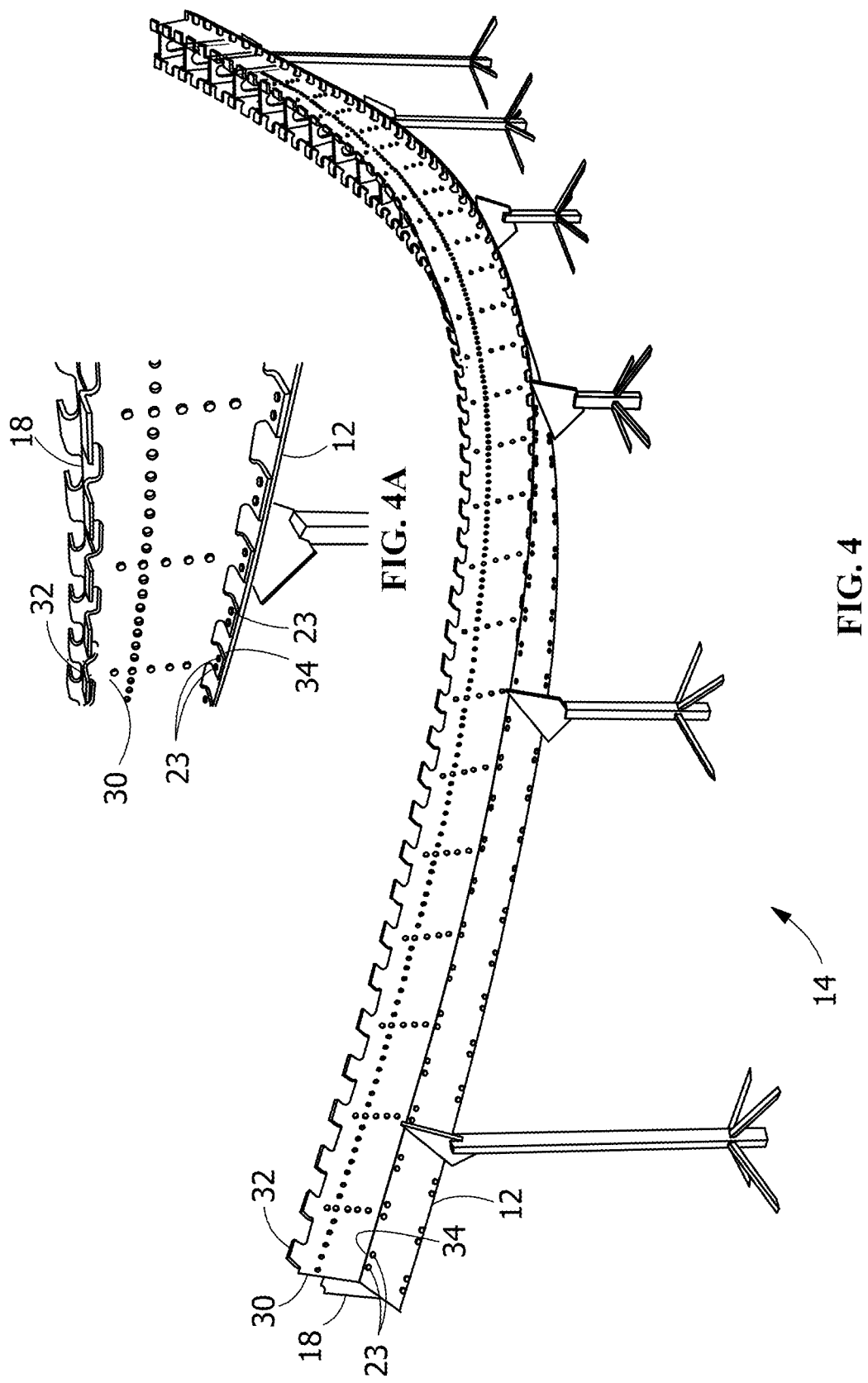

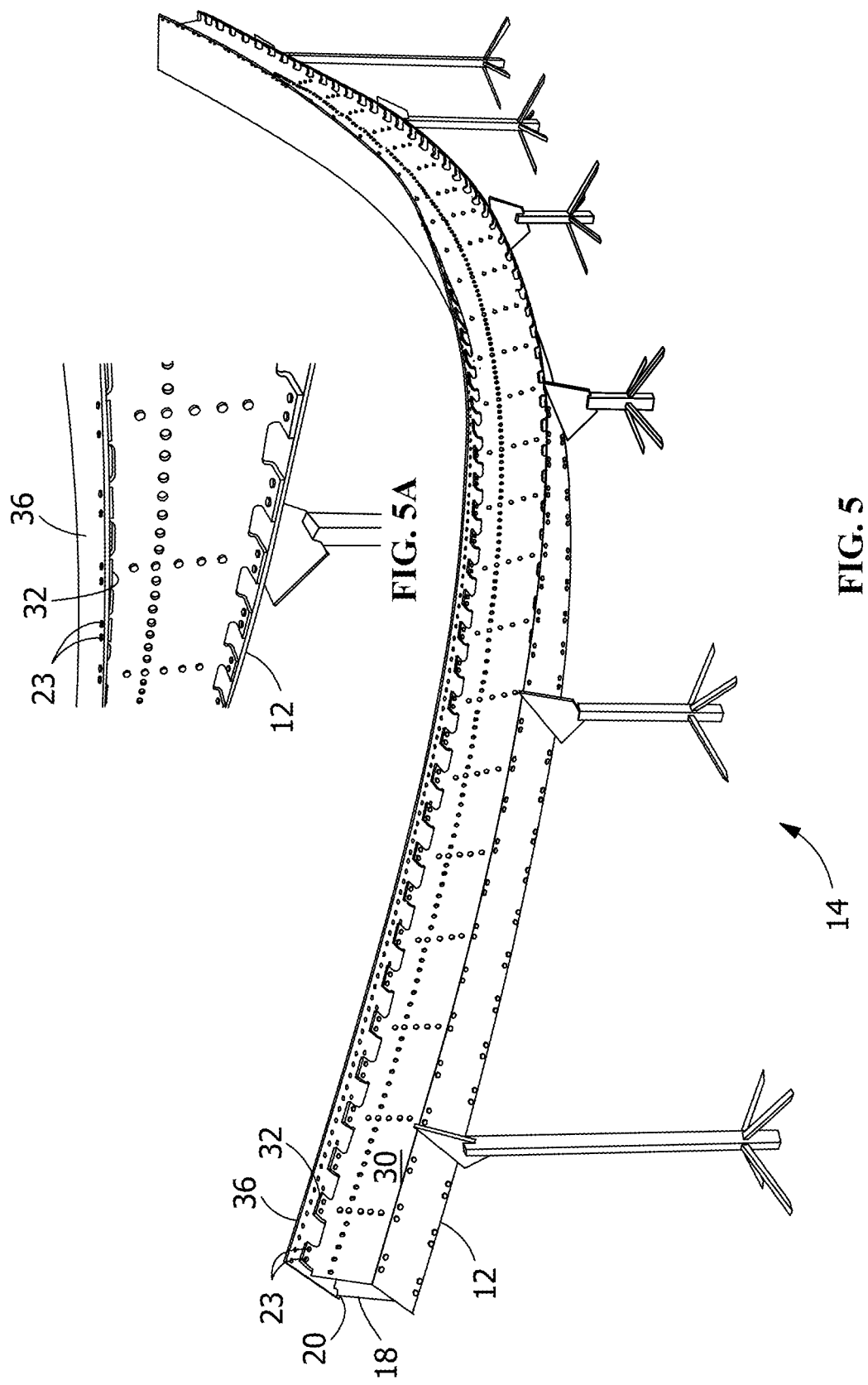

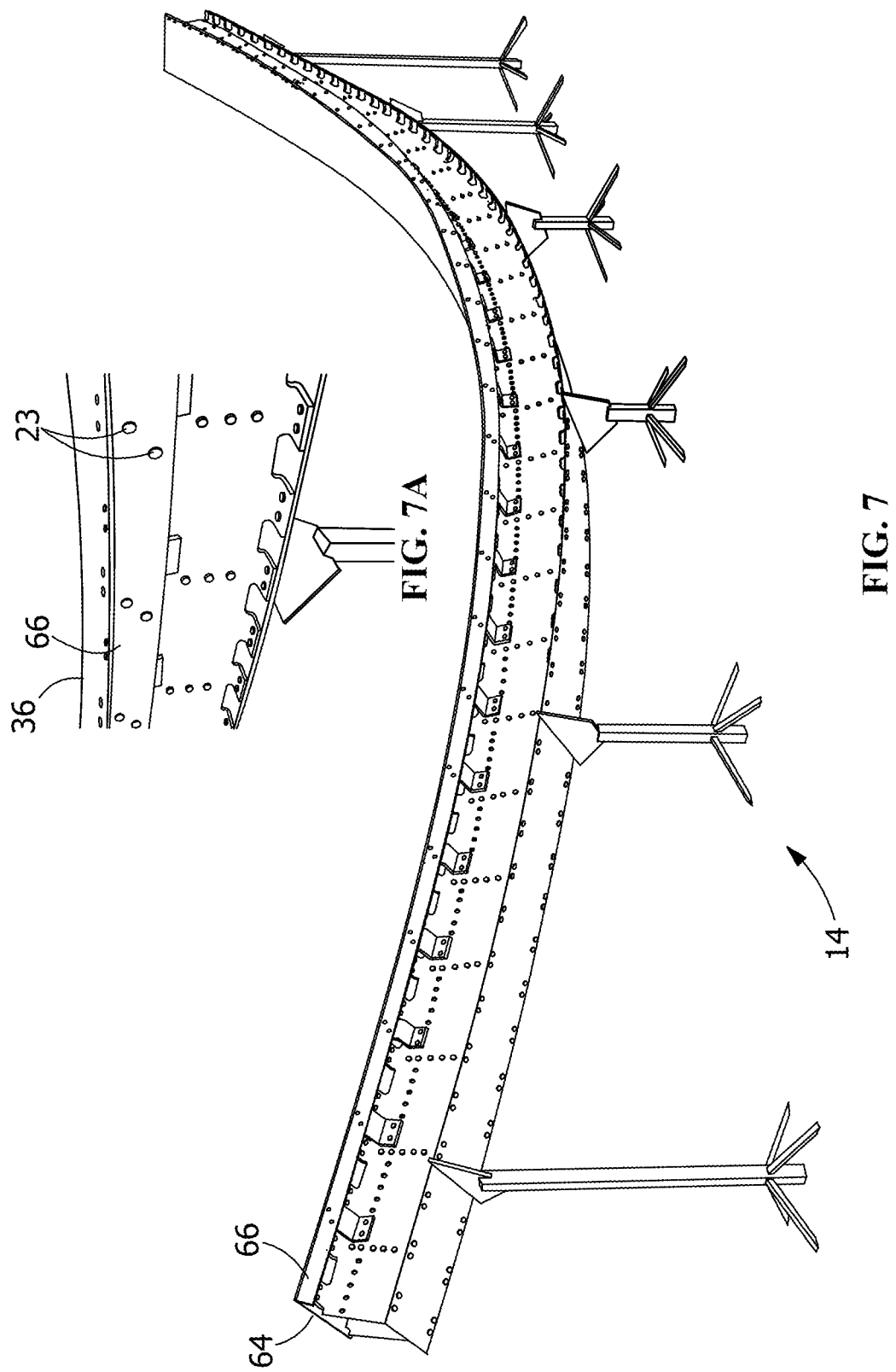

ROLLING VEHICLE TRACK

FIELD OF THE INVENTION

The present invention is a rolling vehicle track and method for making a rolling vehicle track.

BACKGROUND OF THE INVENTION

Roller vehicle tracks, often referred to as roller coasters, have often been made from wood, especially older track. Wood track, even if constructed with laminations, has a lower strength compared to metal, and may be unable to withstand higher stress elements and tighter radiuses that are increasingly in demand by roller vehicle enthusiasts. Moreover, for metal tracks, rust may be a concern, even for painted or galvanized metal track, as a result of welding the track pieces together, which removes the painted or galvanized protective layer adjacent the welded areas, unless special measures are taken. Furthermore, welding may generate fumes that may be hazardous to the welders. Welding, heating and forming processes also may contribute to residual stresses or reductions in allowable design stress that can require the use of more and heavier materials in order to satisfy design requirements and be prone to fatigue cracking necessitating expensive inspection and maintenance procedures while in service.

What is needed is a roller vehicle track and method of manufacturing a roller vehicle track that does not suffer from these infirmities.

SUMMARY OF THE INVENTION

In one embodiment, a rolling vehicle track including a first wall and a second wall each positioned between and connected to a third wall and a fourth wall. The rolling vehicle track further includes a bracket having a first bracket portion, a second bracket portion, a third bracket portion, and a fourth bracket portion, the first bracket portion connected to the third wall, and the fourth bracket portion connected to the first wall. The rolling vehicle track further includes the first wall, the second wall, the third wall, and the fourth wall defining a first quadrilateral chamber. The rolling vehicle track further includes the first bracket portion, the second bracket portion, the third bracket portion, and the first wall defining a second quadrilateral chamber, the first wall, the second wall, the third wall, the fourth wall, and the bracket are interconnected without welding.

In one embodiment, which relates to any combination of the foregoing embodiments, the rolling vehicle track further includes a first strip connected to the third wall.

In one embodiment, which relates to any combination of the foregoing embodiments, the rolling vehicle track further includes a second strip connected to the second bracket portion.

In one embodiment, which relates to any combination of the foregoing embodiments, the rolling vehicle track further includes a third strip connected to the third bracket portion.

In one embodiment, which relates to any combination of the foregoing embodiments, the rolling vehicle track further includes the first wall and the second wall of the first quadrilateral chamber are nonparallel.

In one embodiment, which relates to any combination of the foregoing embodiments, the rolling vehicle track further includes the first wall and the second bracket portion of the second quadrilateral chamber are nonparallel.

In one embodiment, which relates to any combination of the foregoing embodiments, the rolling vehicle track further includes a distance between an end of the first wall and an end of the second wall in close proximity to the third wall is greater than a distance between an end of the first wall and an end of the second wall in close proximity to the fourth wall.

In one embodiment, which relates to any combination of the foregoing embodiments, the rolling vehicle track further includes a distance between an end of the first wall and an end of the second wall in close proximity of the third wall is less than a distance between an end of the first wall and an end of the second wall in close proximity to the fourth wall.

In one embodiment, which relates to any combination of the foregoing embodiments, the rolling vehicle track further includes the first wall, the second wall, the third wall, the fourth wall, and the bracket are interconnected with mechanical fasteners.

In one embodiment, which relates to any combination of the foregoing embodiments, the rolling vehicle track further includes a fourth strip positioned between a second strip and the second bracket portion.

In one embodiment, which relates to any combination of the foregoing embodiments, the rolling vehicle track further includes a fifth strip positioned between a third strip and the third bracket portion.

In one embodiment, which relates to any combination of the foregoing embodiments, the rolling vehicle track further includes the first quadrilateral defines a rectangle.

In one embodiment, which relates to any combination of the foregoing embodiments, the rolling vehicle track further includes the second quadrilateral defines a rectangle.

In one embodiment, which relates to any combination of the foregoing embodiments, the rolling vehicle track further includes a boot for connecting a wood portion of the rolling vehicle track to a non-wood portion of the rolling vehicle track.

In a further embodiment, the rolling vehicle track includes a first wall and a second wall each positioned between and connected to a third wall and a fourth wall. The rolling vehicle track further includes a bracket having a first bracket portion, a second bracket portion, a third bracket portion, and a fourth bracket portion, the first bracket portion connected to the third wall, and the fourth bracket portion connected to the first wall. The rolling vehicle track further includes the first wall, the second wall, the third wall, and the fourth wall defining a first quadrilateral chamber. The rolling vehicle track further includes the first bracket portion, the second bracket portion, the third bracket portion, and the first wall defining a second quadrilateral chamber. The rolling vehicle track further includes a first strip connected to the third wall, a second strip connected to the second bracket portion, and a third strip connected to the third bracket portion. The rolling vehicle track further includes the first wall, the second wall, the third wall, the fourth wall, the bracket, the first strip, the second strip, and the third strip are interconnected without welding.

In a further embodiment, which relates to any combination of the foregoing embodiments, the rolling vehicle track further includes the first wall and the second wall of the first quadrilateral chamber are nonparallel.

In a further embodiment, which relates to any combination of the foregoing embodiments, the rolling vehicle track further includes the first wall and the second bracket portion of the second quadrilateral chamber are nonparallel.

In a further embodiment, which relates to any combination of the foregoing embodiments, the rolling vehicle track further includes a distance between an end of the first wall and an end of the second wall in close proximity to the third wall is greater than a distance between an end of the first wall and an end of the second wall in close proximity to the fourth wall.

In a further embodiment, which relates to any combination of the foregoing embodiments, the rolling vehicle track further includes a distance between an end of the first wall and an end of the second wall in close proximity of the third wall is less than a distance between an end of the first wall and an end of the second wall in close proximity to the fourth wall.

In a further embodiment, which relates to any combination of the foregoing embodiments, the rolling vehicle track further includes the first quadrilateral defines a rectangle.

In a further embodiment, which relates to any combination of the foregoing embodiments, the rolling vehicle track further includes the second quadrilateral defines a rectangle.

In a further embodiment, which relates to any combination of the foregoing embodiments, the rolling vehicle track further includes a boot for connecting a wood portion of the rolling vehicle track to a non-wood portion of the rolling vehicle track

BRIEF DESCRIPTION OF THE DRAWINGS OF THE INVENTION

FIGS. 1-8 and corresponding FIGS. 1A-8A are upper perspective views of an exemplary roller vehicle track being sequentially assembled, with FIGS. 1A-8A being enlarged, partial upper perspective views rotated about a vertical axis taken from their corresponding FIGS. 1-8.

Wherever possible, the same reference numbers will be used throughout the drawings to refer to the same or like parts.

DETAILED DESCRIPTION OF THE INVENTION

Figures 6, 6A:
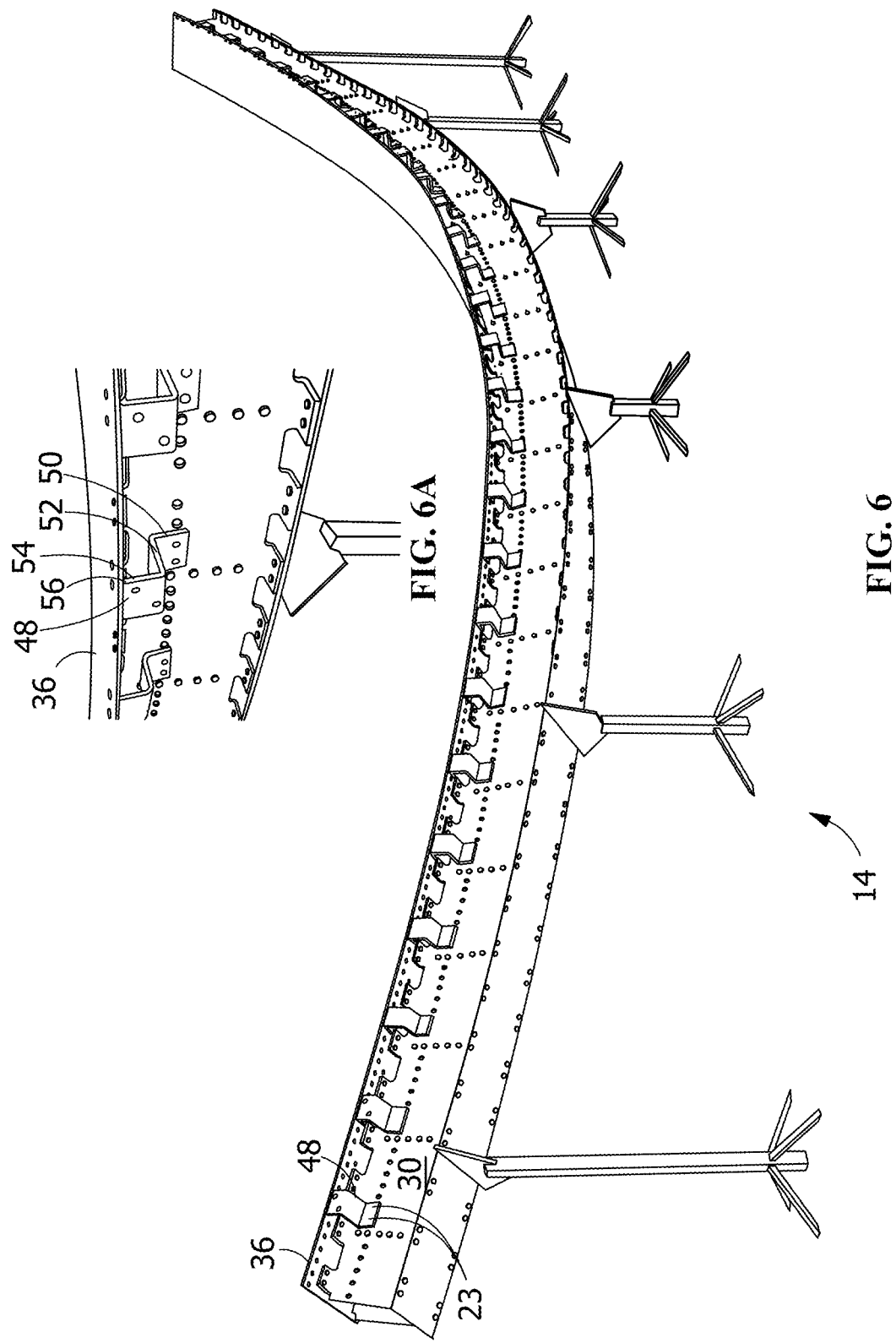

This invention allows for several innovations over other roller vehicle tracks made from steel or other suitable metal or material. This invention is planned to be substituted for wooden track on a roller vehicle track for partial or complete layouts, but may also be substituted for metal track or other suitable material for partial or complete layouts. This roller vehicle track construction will allow higher stress elements and tighter radiuses that are either difficult or impossible to fabricate with a conventional wood laminate track. This construction does not require welding, and does not utilize welding to permanently secure track members together (i.e., walls, brackets, cross members, strips as will be further discussed in more detail below) instead utilizing other manufacturing techniques and materials not requiring elevated temperatures such as mechanical fasteners, adhesives or other suitable techniques, allowing fabrication without complicated tools or equipment that is required for welded track and increasing the fatigue life of the track. The assembly process allows for all sides of the vehicle track components to be coated with rust prevention paint or galvanizing prior to assembly, without concerns over inadvertent removal of such protective layers during assembly, which would otherwise occur with welding. The open design also permits a greater number of locations to perform internal inspections to confirm vehicle track integrity.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

Figure 12:
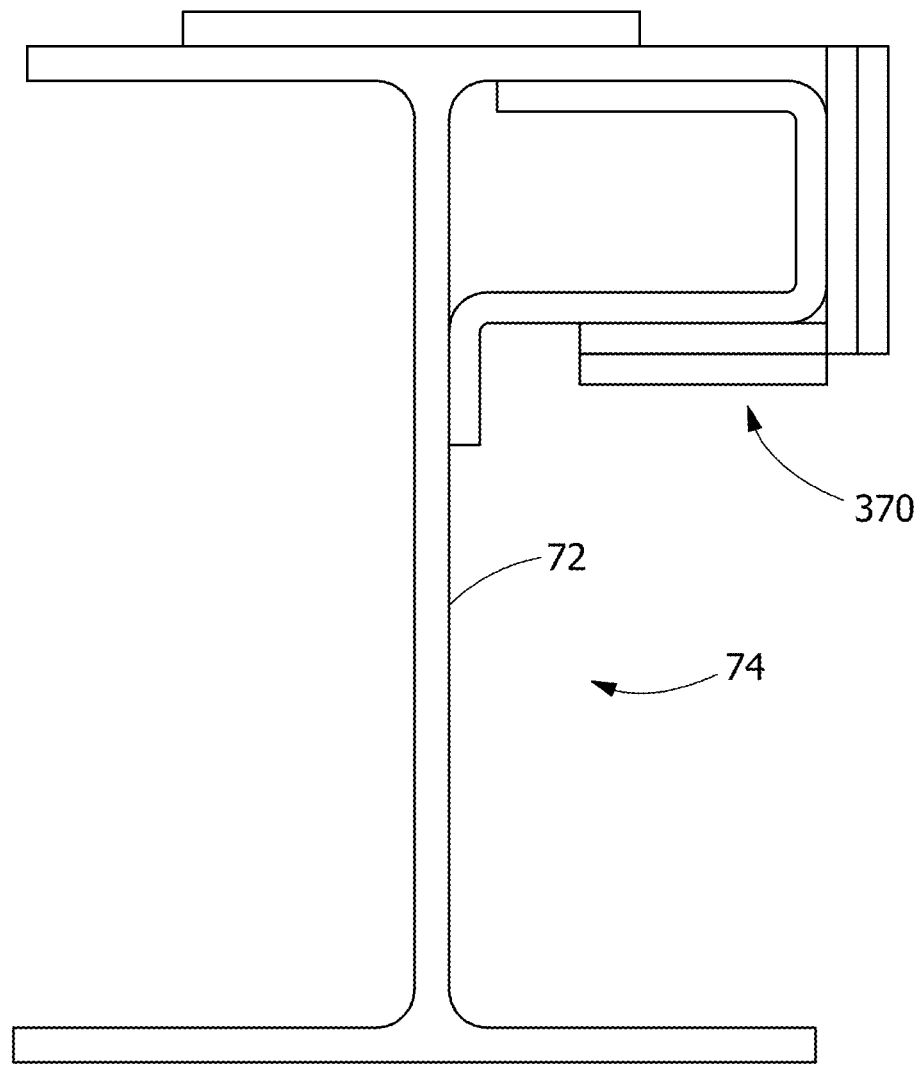
FIG. 12 is an end view of an exemplary roller vehicle track.
Figure 13:
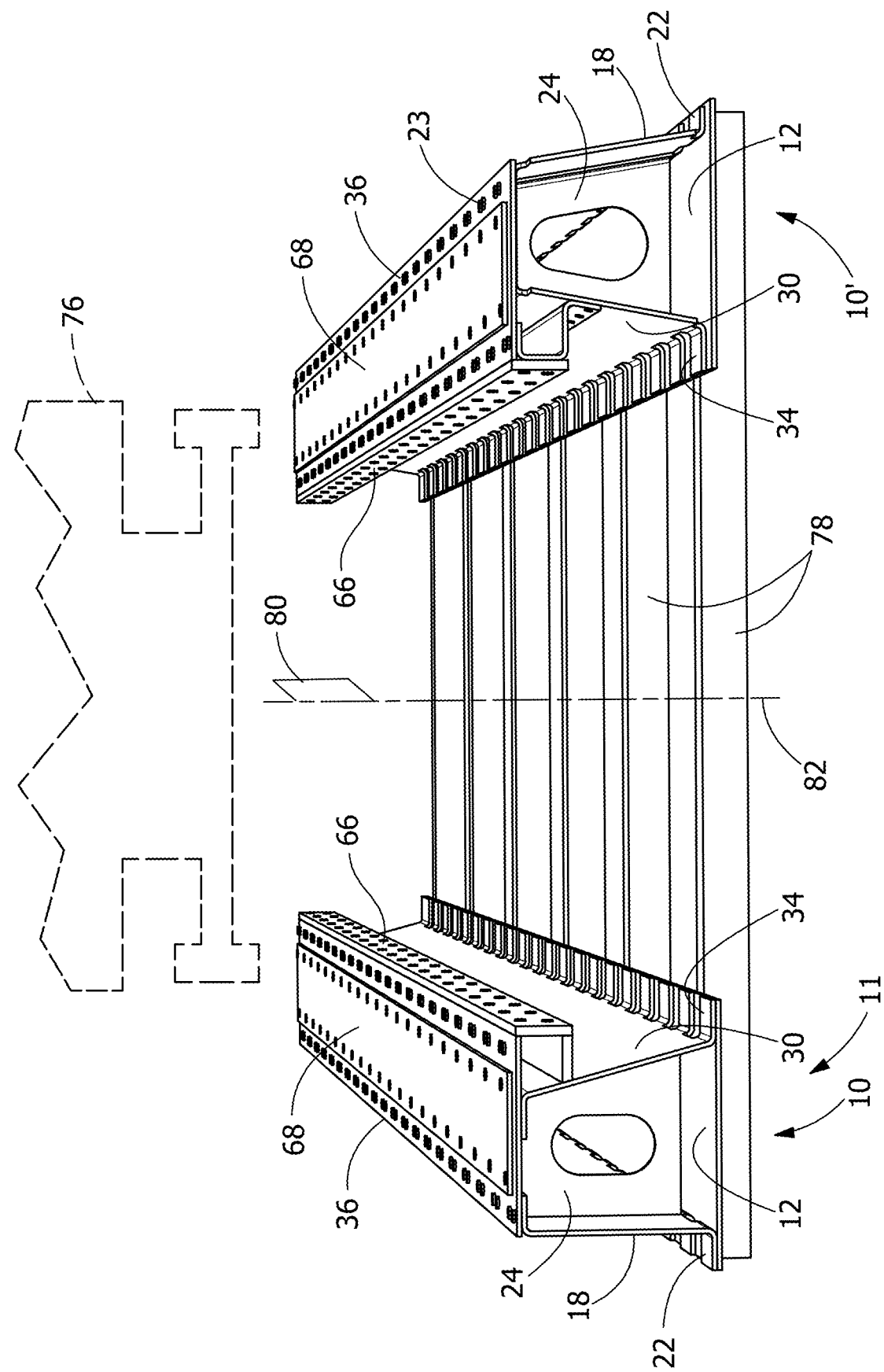
FIG. 13 is an upper perspective view of a section of an exemplary roller vehicle track.

FIG. 13 shows a section of a full roller coaster track 11 used to rollably or rotatably carry a roller coaster car 76 as is well known. The full roller coaster track 11 uses support members 78 to interconnect roller coaster tracks 10, 10' or roller coaster track portions which are mirror images of one another relative to a plane 80 coincident with a center line 82. As a result of roller coaster tracks 10, 10' being mirror images of one another, for brevity, only roller coaster track 10 will be further discussed in FIGS. 1-8, corresponding FIGS. 1A-8A, and FIGS. 9-12.

For purposes herein, the term roller coaster track(s), roller coaster track portion(s) and the like may be used interchangeably.

Figures 8, 8A:
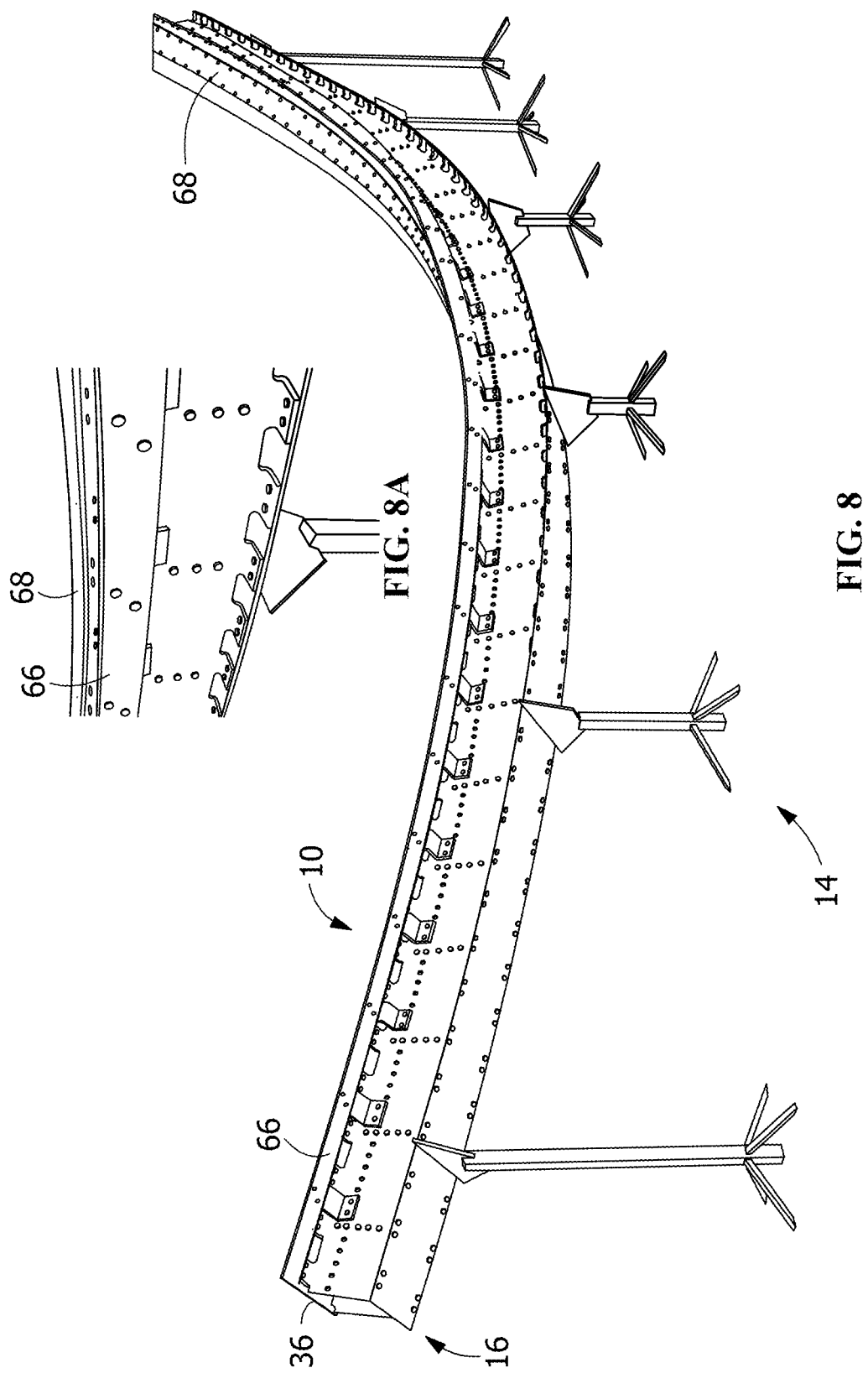
Figure 9:
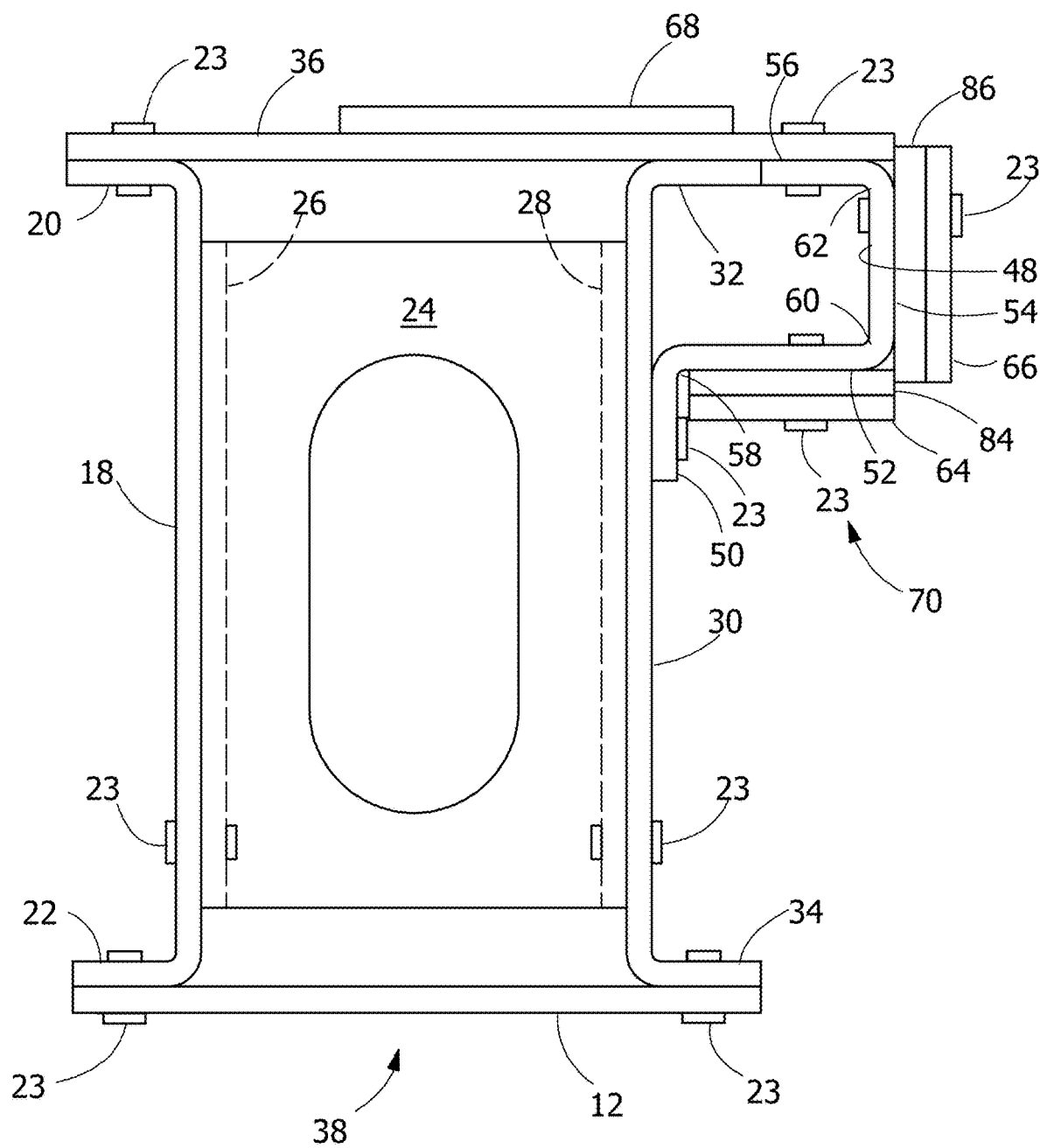
FIG. 9 is an end view of an exemplary roller vehicle track.

FIGS. 1-8 and associated FIGS. 1A-8A show sequential steps for assembling an exemplary rolling vehicle track, often referred to as a roller coaster track 10 (FIG. 8). FIG. 9 is an end view of roller coaster track 10, with FIGS. 10-12 being alternate embodiments thereof. The components of the track are secured together by mechanical fasteners such as rivets, nuts and bolts or other suitable components. Spatial or relative positioning terminology used for assembling roller coaster track 10 is based from the orientation of an end view of an end 16 (FIG. 8) looking toward roller coaster track 10 as shown in FIG. 9. As will be described in further detail below, the track components are cut from sheet stock using a surface method based on the geometry of the roller coaster track centerline 82 (FIG. 13), which is the path the ride follows. The track, including curved portions such as those that turn, twist or otherwise curve in three-dimensions, may be designed on a computer using any appropriate computer-aided-design program which can also calculate how components which exist in three-dimensional space can be translated to 2-D components for cutting from sheet stock, which may, for example, have a nominal thickness ranging from 0.125 inches up to 0.625 inches.

As shown in FIGS. 1 and 1A, a wall 12, sometimes referred to as a flange or a bottom flange is placed or positioned on a fixture 14. In one embodiment, fixture 14 may include features or components (not shown) utilized for temporarily positioning or for securing wall 12 in three-dimensional space, acting as both a jig and a structural support base for the track. Along with temporary fixtures (not shown) the developable surface of the walls of the track components, once assembled, will create the three-dimensional roller coaster track. Mechanical fasteners (not shown) secure fixture 14 to wall 12 (and other track components, as applicable or required). Optionally, fixture 14 may be secured to wall 12 or other track components by temporary welding, adhesive, or other assembly technique, if desired.

Once wall 12 has been positioned or placed on fixture 14, as shown in FIGS. 2, 2A and 9, a wall 18 having a plurality of opposed tabs 20, 22 is installed or secured to wall 12. More specifically, as shown in FIG. 9, tabs 22, which extend from wall 18, are secured to wall 12 such as by mechanical fasteners 23. Once tabs 22 are secured to wall 12, as shown in FIGS. 3, 3A and 9, a plurality of cross braces 24 each having opposed flanges 26, 28 are installed or secured to wall 18 as needed. More specifically, flanges 26, which extend from cross braces 24, are secured to wall 18 such as by mechanical fasteners 23. Once flanges 26 are installed or secured to wall 18, as shown in FIGS. 4, 4A and 9, a wall 30 having a plurality of opposed tabs 32, 34 is installed or secured to wall 12 and cross braces 24. More specifically, as shown in FIGS. 4A and 9, tabs 34, which extend from wall 30, are secured to wall 12 such as by mechanical fasteners 23, and flanges 28 (FIG. 9) opposite flanges 26 (FIG. 9) of cross braces 24 (FIG. 9) are secured to wall 18 such as by mechanical fasteners 23.

Figure 10:
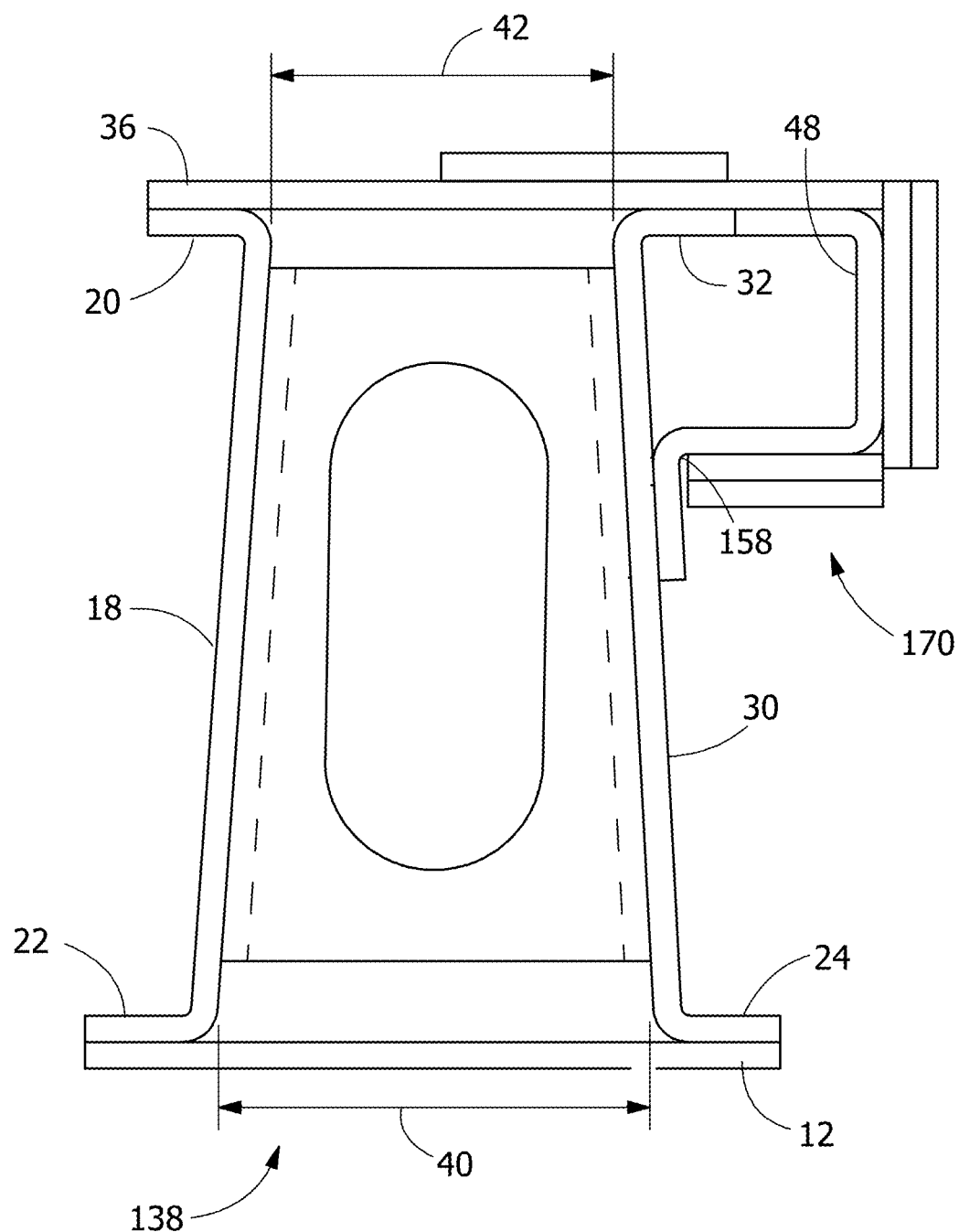
FIG. 10 is an end view of an exemplary roller vehicle track.
Figure 11:
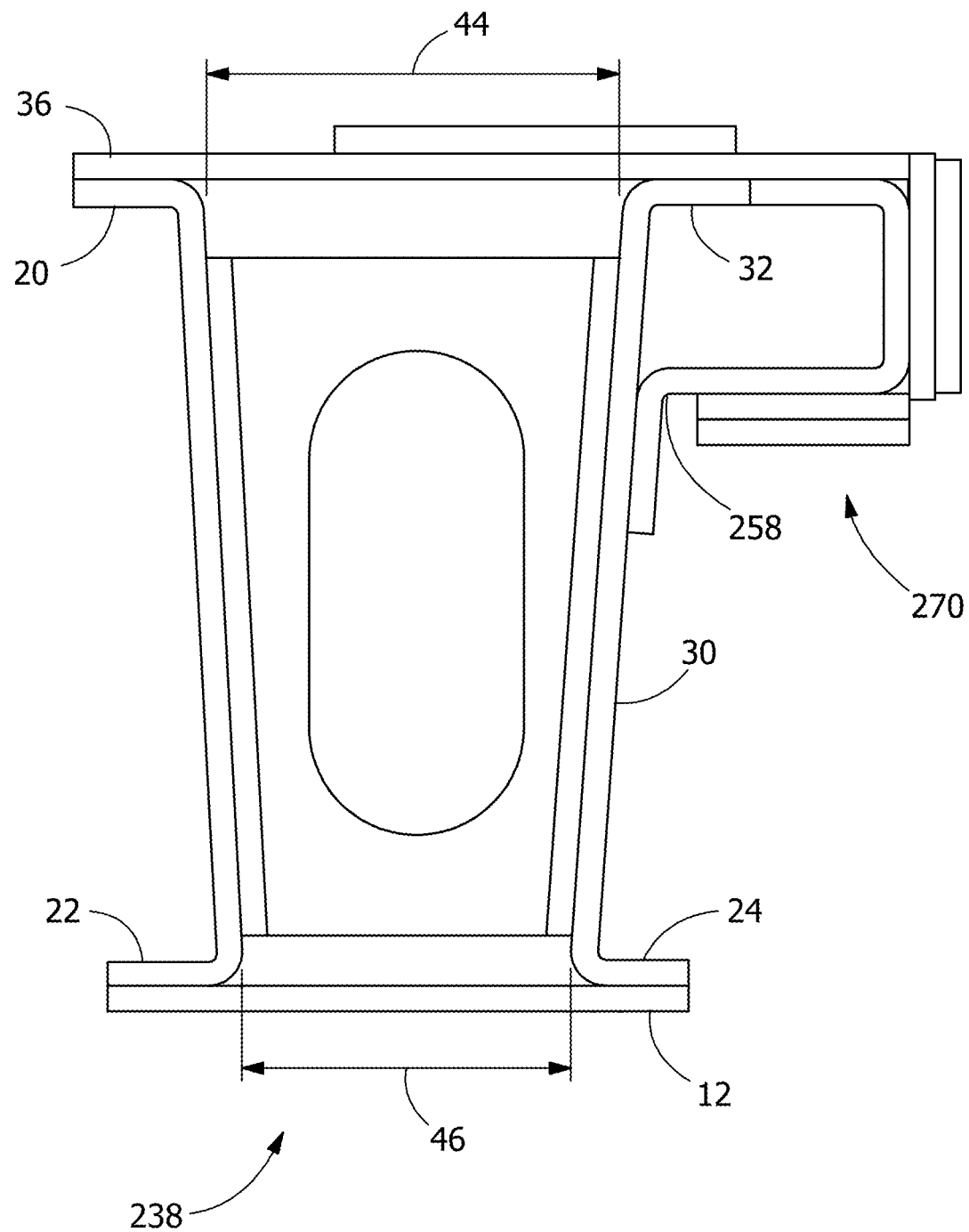
FIG. 11 is an end view of an exemplary roller vehicle track.

Once wall 30 has been installed or secured to fixture 14 and cross braces 24, as shown in FIGS. 5, 5A and 9, a wall 36, sometimes referred to as a top flange or flange, is installed or secured to walls 18, 30. More specifically, wall 36 is secured to tabs 20 of wall 18 and tabs 32 of wall 30 such as by mechanical fasteners 23. As a result, as shown in FIG. 9, walls 18, 30, walls 12, 36, and the outside bend radii transitioning between walls 18, 30 and their respective tabs 20, 22 and 32, 34 define a chamber or a closed geometry 38 such as a quadrilateral. As further shown in FIG. 9, for closed geometry 38, walls 18, 30 are parallel to one another, and walls 12, 36 are parallel to one another, with walls 18, 30 and walls 12, 36 being perpendicular to one another, defining a rectangle. However, walls 18, 30 may not be perpendicular to walls 12, 36, or stated another way, walls 18, 30 may be nonparallel to one another, in order to allow optimal distribution of loads. For example, in one embodiment, as shown in FIG. 10, for a chamber or closed quadrilateral geometry 138, the ends of walls 18, 30 in close proximity to wall 12 are separated by a distance 40 which is greater than a distance 42 separating the ends of walls 18, 30 in close proximity to wall 36, resulting in closed geometry 138 defining a trapezoid. That is, walls 18, 30 are nonparallel, with the angle subtended between wall 30 and flange 32 forming part of closed quadrilateral geometry 138 being less than 90 degrees. In one embodiment, as shown in FIG. 11, for a chamber or a closed quadrilateral geometry 238, the ends of walls 18, 30 in close proximity to wall 12 are separated by a distance 46 which is less than a distance 44 separating the ends of walls 18, 30 in close proximity to wall 36, resulting in a chamber or closed quadrilateral geometry 238 defining a trapezoid that is inverted compared to the trapezoid of FIG. 10. That is, in FIG. 11, walls 18, 30 are nonparallel, with the angle subtended between wall 30 and flange 32 forming part of closed quadrilateral geometry 238 being greater than 90 degrees.

Once wall 36 is installed or secured to walls 18, 30, as shown in FIGS. 6, 6A and 9, a plurality of brackets 48 is attached or secured to wall 30 and wall 36. More specifically, each bracket 48 includes multiple bracket portions 50, 52, 54, 56 between which corresponding bends 58, 60, 62 are formed. As shown, each bracket portion 50 is secured to wall 30 and each bracket portion 56 is secured to wall 36, such as by mechanical fasteners 23, with bracket portions 52, 54, 56, and wall 30 (including flange 32 of wall 30) defining closed geometry 70 or chamber such as a quadrilateral. As further shown in FIG. 9, bends 58, 60, 62 are 90 degrees, as the surfaces of bracket portions 52, 54 are perpendicular to one another, the surfaces of bracket portions 54, 56 are perpendicular to one another, and the surfaces of bracket portions 54, 56 are parallel to one another, and the surfaces of wall 30 and flange 32 are perpendicular to one another. As a result, the chamber or closed geometry 70 defines a rectangle. However, as an extension of previously discussed FIGS. 10 and 11, as is appreciated by one having ordinary skill in the art, the magnitude of bend 158 (FIG. 10) is greater than 90 degrees, and the magnitude of bend 258 (FIG. 11) is less than 90 degrees. As shown, the surfaces defining closed quadrilateral geometry 70 (FIG. 9), 170 (FIG. 10), 270 (FIG. 11) and 370 (FIG. 12) include corresponding surfaces of bracket portions 52, 56 being parallel to one another, and surface of bracket portion 54 being perpendicular to each of surfaces of bracket portions 52, 56. However, in each of FIGS. 10-11, surface of wall 30 is not perpendicular to either of corresponding surfaces of bracket portions 52, 56 defining closed quadrilateral geometries 170 (FIG. 10) and 270 (FIG. 11), and surface of wall 30 is similarly nonparallel to the surface of bracket portion 54 defining corresponding closed quadrilateral geometries 170 (FIG. 10) and 270 (FIG. 11).

Once bracket 48 is attached or secured to wall 30 and wall 36, as collectively shown in FIGS. 7, 7A, 9, a strip 64, typically referred to as an upstop or upstop steel, and a strip 66, typically referred to as a guide or guide steel, is attached or secured to bracket 48 to provide a surface to be directly engaged by upstop and guide wheels, respectively, of roller coaster car 76 (FIG. 13). More specifically, as shown in FIG. 9, strip 64 is secured to bracket portion 52 such as by mechanical fasteners 23, and strip 66 is secured to bracket portion 54 by mechanical fasteners 23. As shown in FIG. 9, bracket portion 50 is disposed between strip 64 and wall 30. Optionally, as shown in FIG. 9, a strip 84 is disposed or positioned between bracket portion 52 and strip 64, and a strip 86 is disposed or positioned between bracket portion 54 and strip 66. In other embodiments, additional strips may be disposed or positioned between the corresponding bracket portions and their corresponding strips 64, 66. In one embodiment, the thickness of the strips may be the same. In one embodiment, the thicknesses of at least one of the strips may be different than the other strips. In one embodiment, the number of strips between bracket portion 52 and strip 64 may be the same as the number of strips between bracket portion 54 and strip 66. In one embodiment, the number of strips between bracket portion 52 and strip 64 may be different from the number of strips between bracket portion 54 and strip 66. Considerations regarding the number and thickness of the strips include, but are not limited to geometry, such as size of the radii of the bracket portion bends, as the bend radii of thicker material may otherwise result in excessive elastic strain values, resulting in undesirable plastic deformation during fabrication.

Once strips 64, 66 are secured to respective bracket portions 52, 54, as collectively shown in FIGS. 8, 8A, 9, a strip 68, typically referred to as a road or road steel, is installed or secured to wall 36 and provides a surface to be engaged by running wheels of a roller coaster car.

Once strips 64, 66 are secured to respective bracket portions 52, 54, 56, a closed geometry 70 is defined by bracket portions 52, 54, 26, wall 30, tabs 32, wall 36, and strips 64, 66 and corresponding bend radii transitioning between the bracket portions, as well as the bend radii transitioning between wall 30 and tabs 32. As further shown in FIG. 9, for closed geometry 70, wall 30 and bracket portions 54 are parallel to one another. However, the wall 30 and bracket portions 54 may not be parallel to one another in order to allow optimal distribution of loads. That is, as a result of closed geometries 170, 270 as previously discussed for FIGS. 10 and 11 sharing a common wall 30 and defining quadrilaterals, respective closed geometries 170, 270 of FIGS. 10 and 11 each also define quadrilaterals.

In one embodiment, instead of opposed walls 18, 30, as shown in FIG. 9, the walls, such as for a straight section of track may be consolidated into a single wall, such as shown in FIG. 12 with a web 72 of an I-beam 74, which lacks a closed geometry 38 of FIG. 9, but includes a closed geometry 370 similar to closed geometry 70 as shown in FIG. 9.

It is to be understood that the sequence of steps may be different than proceeding sequentially in order from FIGS. 1-8.

Figure 14:
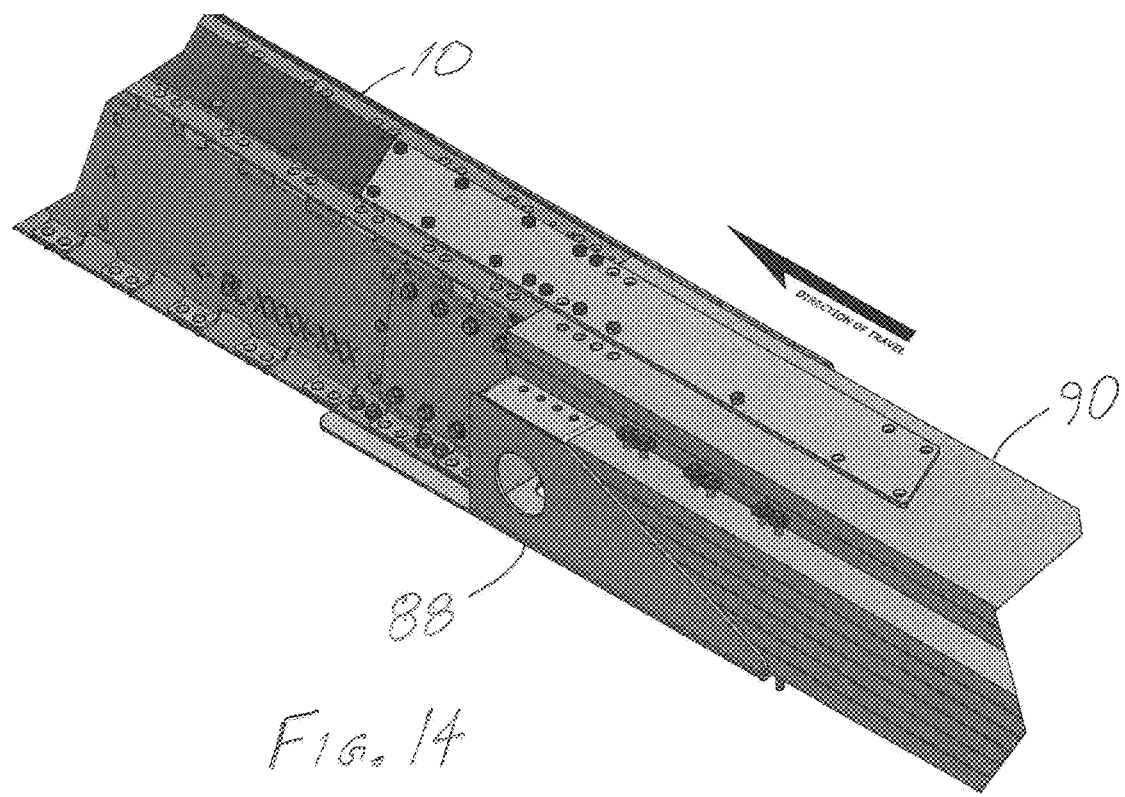
FIG. 14 is an upper perspective view of an exemplary boot connecting a wood portion of a roller vehicle track with a non-wood portion of a roller vehicle track.
Figure 15:
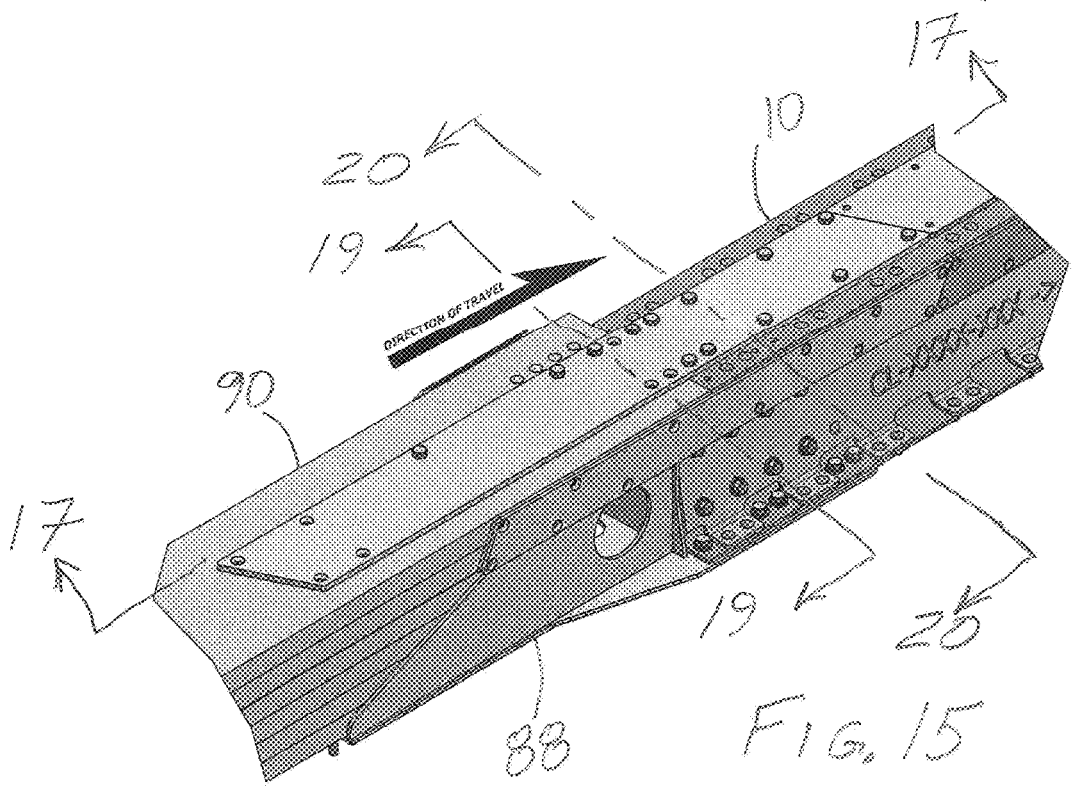
FIG. 15 is a reverse upper perspective view of the boot connecting the wood portion of the roller vehicle track with the non-wood portion of the roller vehicle track of FIG. 14.
Figure 16:
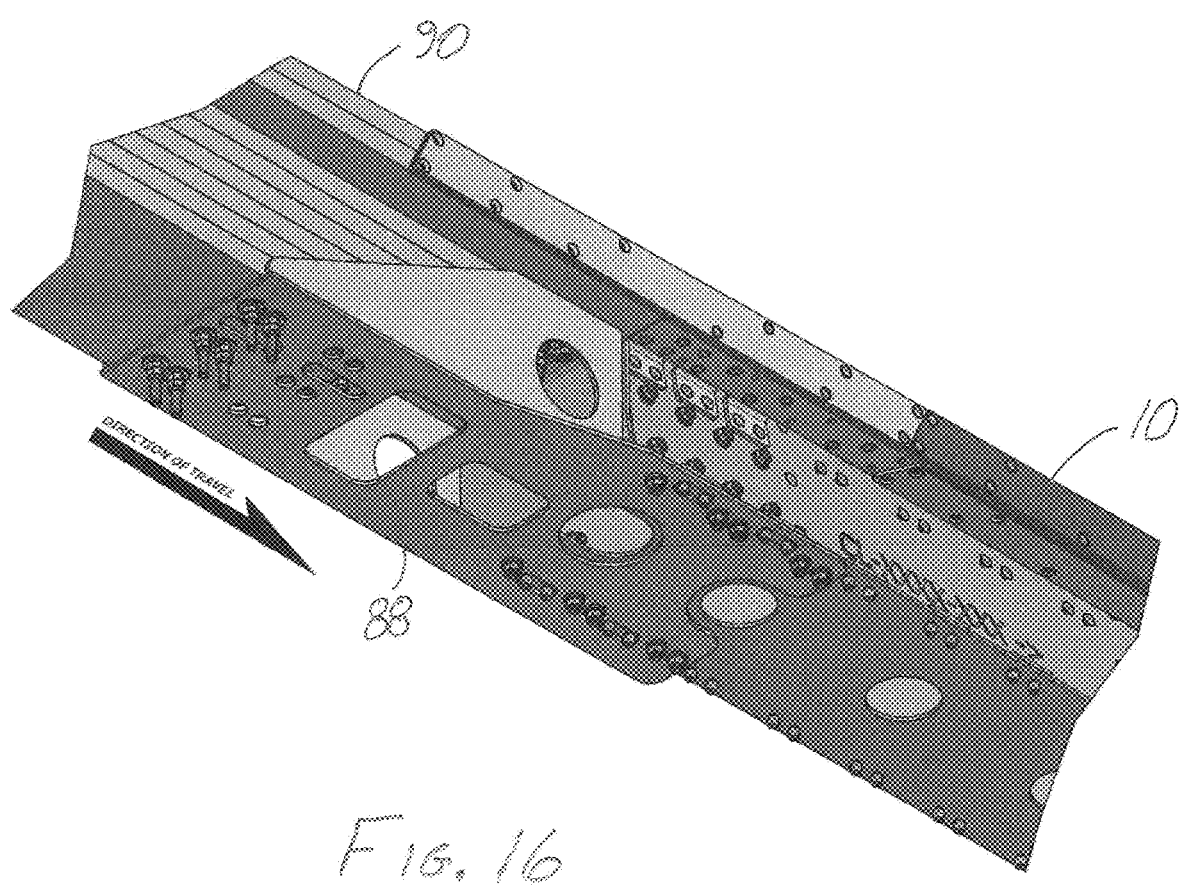
FIG. 16 is a reverse lower perspective view of the boot connecting the wood portion of the roller vehicle track with the non-wood portion of the roller vehicle track of FIG. 14.
Figure 18:
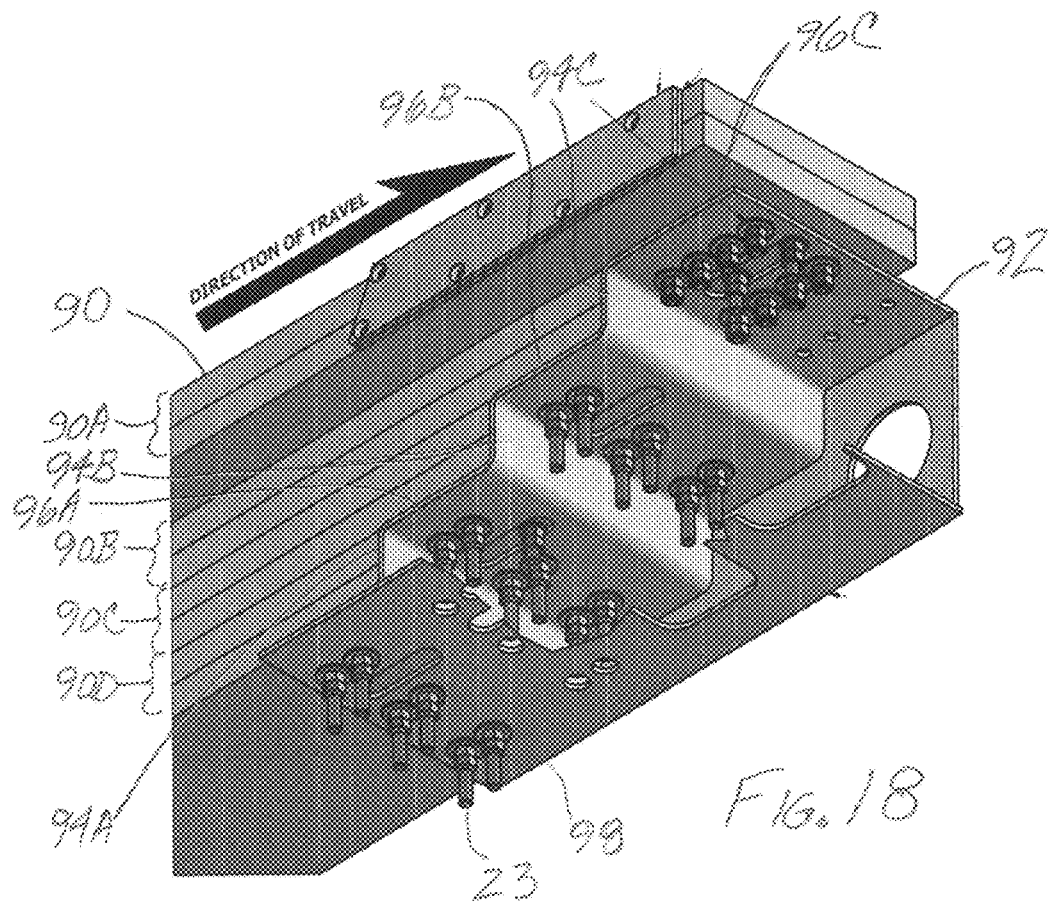
FIG. 18 is a reverse lower perspective cutaway view of the boot connecting the wood portion of the roller vehicle track with the non-wood portion of the roller vehicle track of FIG. 16.
Figure 17:
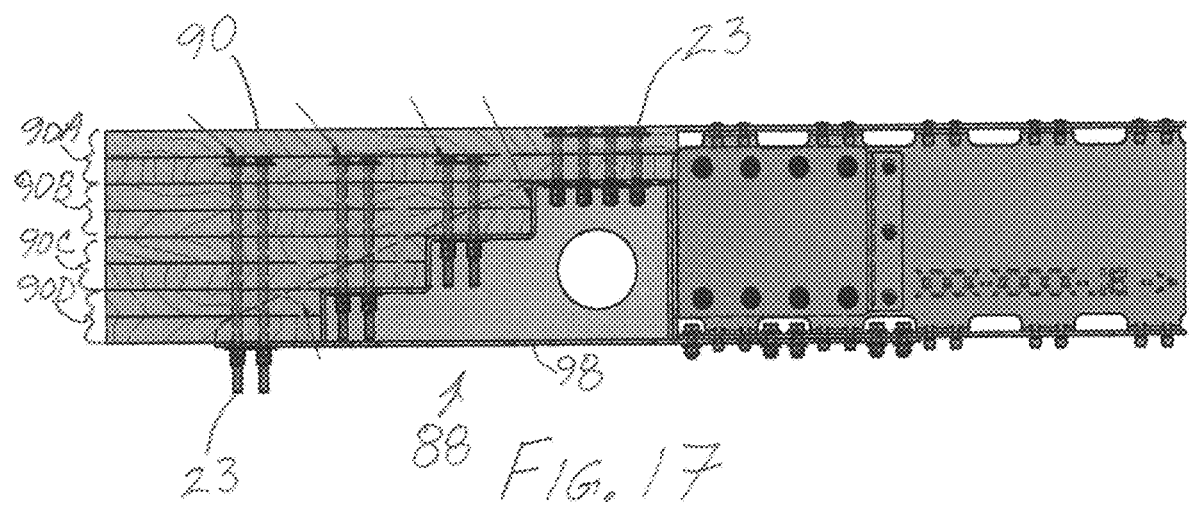
FIG. 17 is a cross section of the boot connecting the wood portion of the roller vehicle track with the non-wood portion of the roller vehicle track taken along line 17-17 of FIG. 15.

As shown in FIGS. 14-25, and more specifically in FIGS. 14-16, an exemplary boot 88 may be used to connect a wood portion 90 of a roller coaster track to a corresponding non-wood portion, such as roller coaster track 10 as previously discussed. As shown in FIGS. 17-18, wood portion 90 includes laminate portions 90A, 90B, 90C, 90D that engage a step plate 92 having corresponding risers 94A, 94B, 94C separated by corresponding treads 96A, 96B, 96C. More specifically, the end of laminate portion 90D abuts riser 94A, the end of laminate portion 90C abuts riser 94B, and the end of laminate portion 90B abuts riser 94C. Further, a base 98 of boot 88 supports and is connected to laminate portion 90D proximate its end by mechanical fasteners 23, tread 96A supports and is connected to laminate portion 90C proximate its end by mechanical fasteners 23, tread 96B supports and is connected to laminate portion 90B proximate its end by mechanical fasteners 23, and tread 96C supports and is connected to laminate portion 90A proximate its end by mechanical fasteners 23. Step plate 92 permits operating loads at the spliced end of the wood portion to be distributed over a larger area.

It is to be understood that in other embodiments, the step plate may be adapted to accommodate a different number of laminate portions than four, and that the laminate portions may have different thicknesses.

Figure 20:
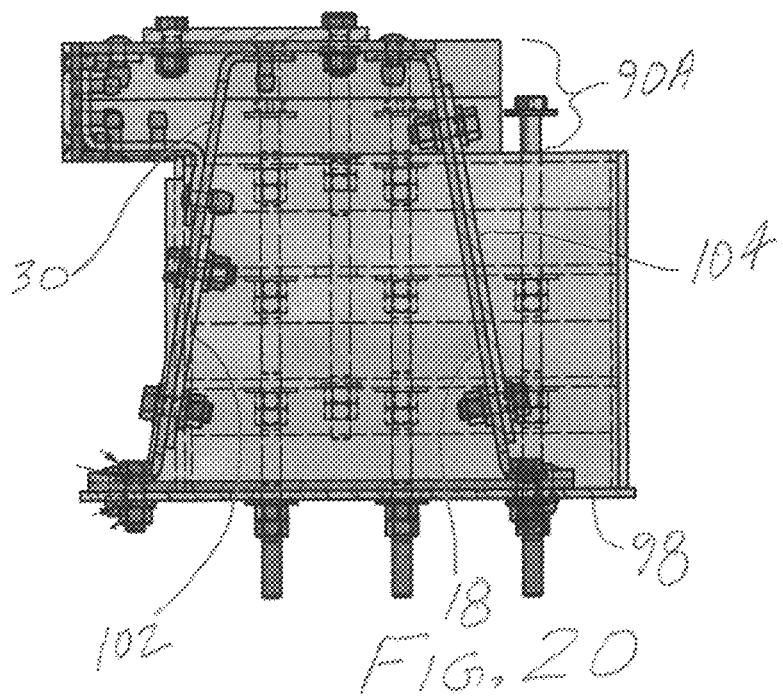
FIG. 20 is a cross section of the boot connecting the wood portion of the roller vehicle track with the non-wood portion of the roller vehicle track taken along line 20-20 of FIG. 15.
Figure 19:
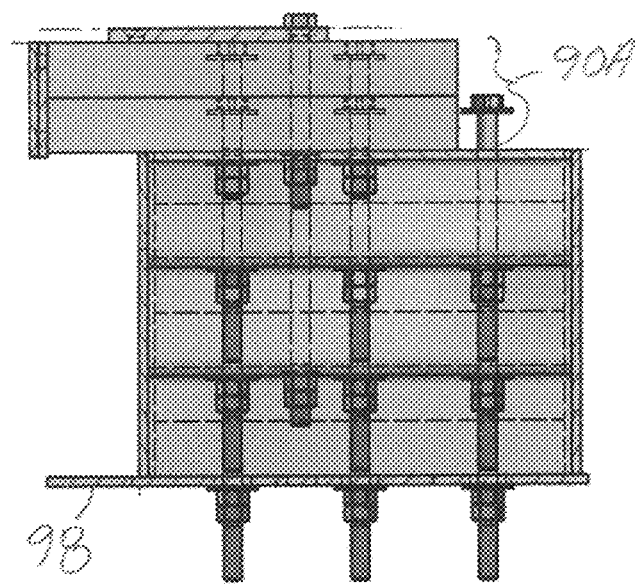
FIG. 19 is a cross section of the boot connecting the wood portion of the roller vehicle track with the non-wood portion of the roller vehicle track taken along line 19-19 of FIG. 15.
Figure 21:
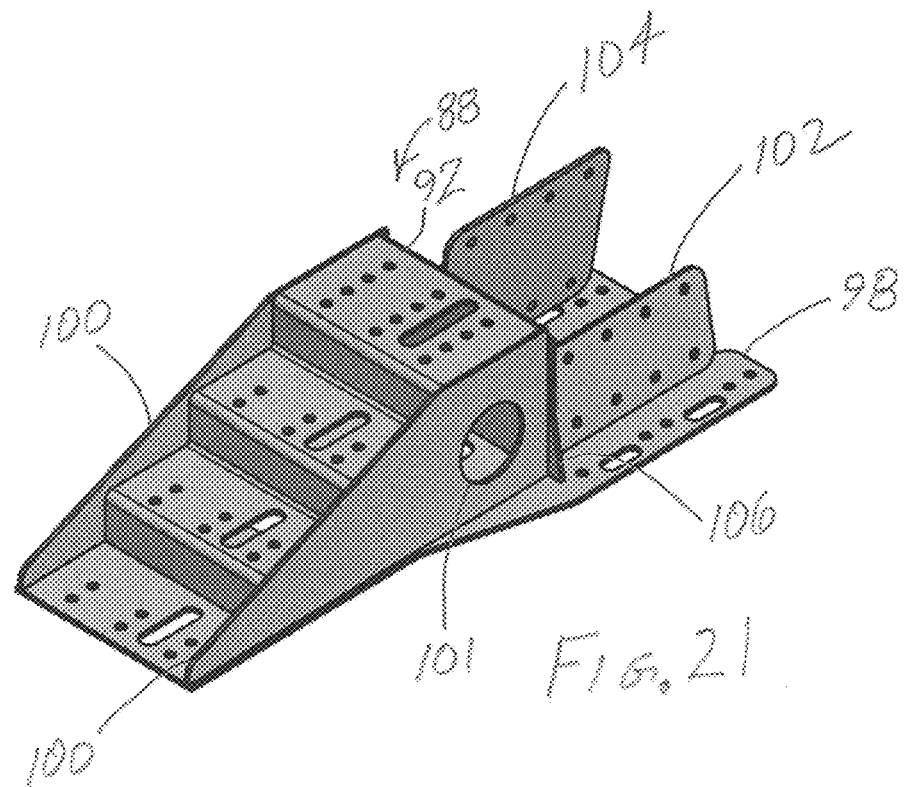
FIG. 21 is a reverse upper perspective view of the boot of FIG. 14.
Figure 22:
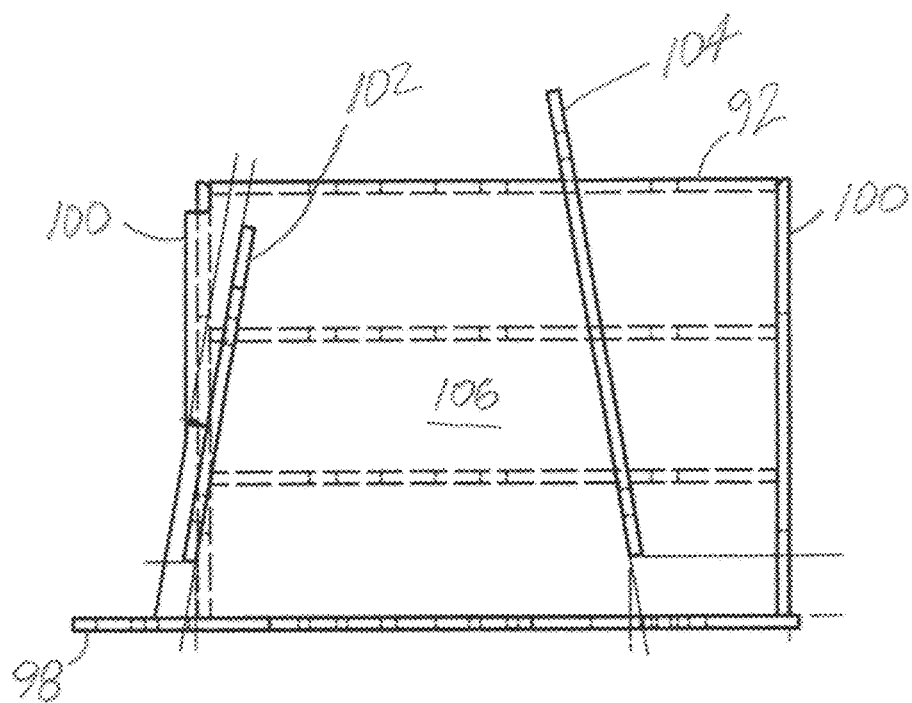
FIG. 22 is an end view of the boot of FIG. 21.
Figure 23:
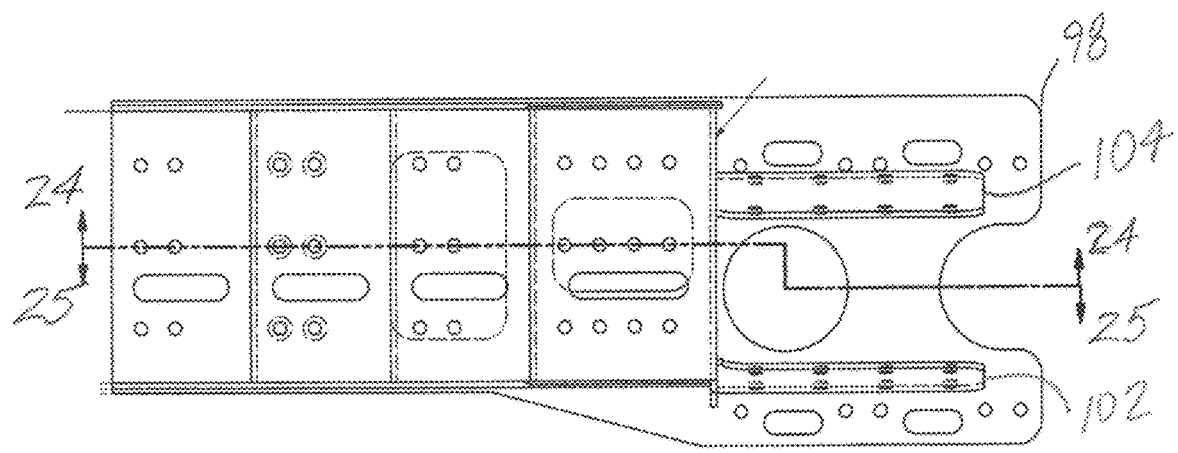
FIG. 23 is a plan view of the boot of FIG. 21.
Figure 24:
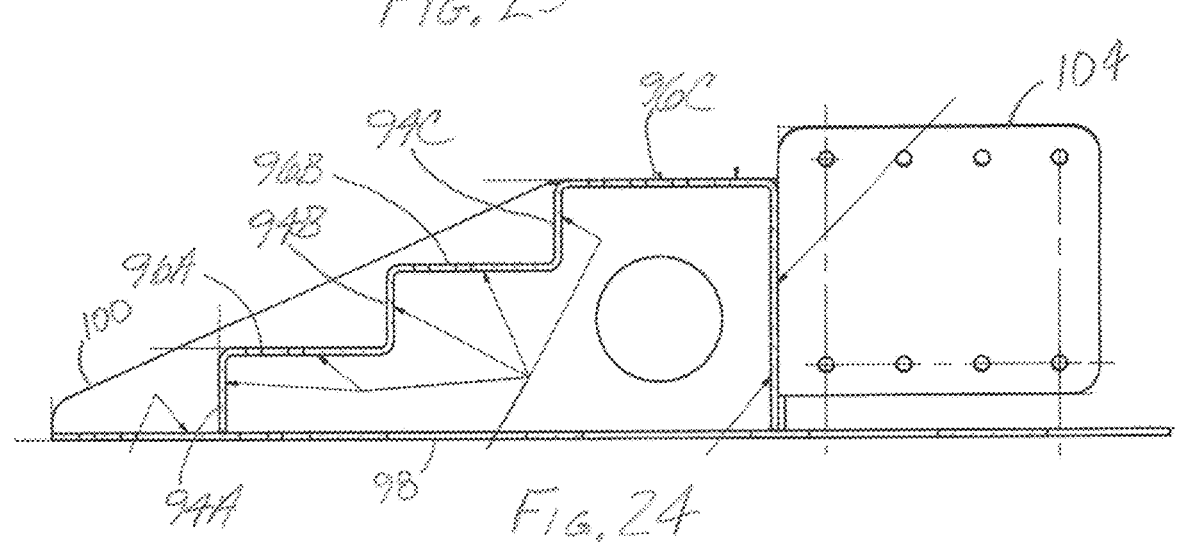
FIG. 24 is a cross section taken along line 24-24 of FIG. 23.
Figure 25:
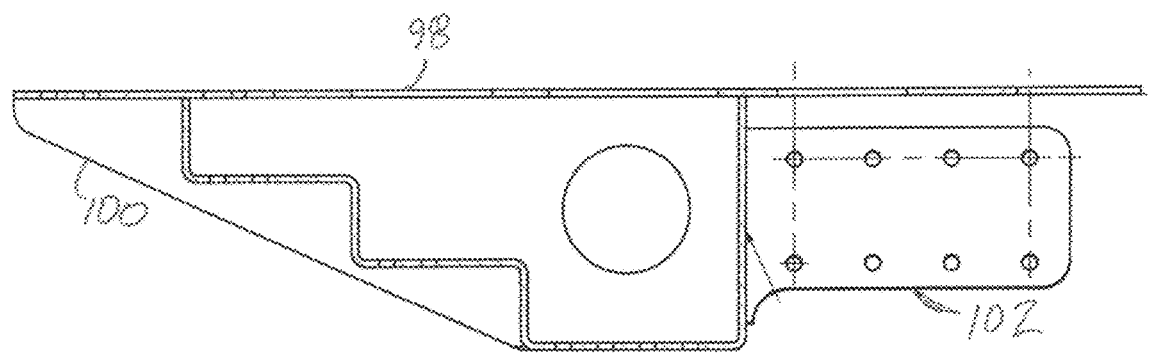
FIG. 25 is a cross section taken along line 25-25 of FIG. 23.

As shown in FIGS. 21-25, and more specifically, FIG. 21, boot 88 includes an opposed pair of side plates 100 secured to step plate 92. As shown, each side plate 100 includes an opening 101, permitting inspection of mechanical fasteners and surfaces of step plate 92 and base 98 subsequent to assembly and for maintenance. Boot 88 further includes plates 102, 104 secured to a base 106 of step plate 92 opposite riser 92A that extends in a direction opposite plates 100. As shown in FIG. 20, which is a cross section taken along line 20-20 of FIG. 15, plate 102 is connected to wall 30 of roller coaster track 10 and plate 104 is connected to wall 30 of roller coaster track 10.

It is to be understood that the various descriptions of the embodiments disclosed herein have been simplified to illustrate only those elements, features, and aspects that are relevant to a clear understanding of the disclosed embodiments, while eliminating, for purposes of clarity, other elements, features, and aspects. Persons having ordinary skill in the art, upon considering the present description of the disclosed embodiments, will recognize that other elements and/or features may be desirable in a particular implementation or application of the disclosed embodiments. However, because such other elements and/or features may be readily ascertained and implemented by persons having ordinary skill in the art upon considering the present description of the disclosed embodiments, and are therefore not necessary for a complete understanding of the disclosed embodiments, a description of such elements and/or features is not provided herein. As such, it is to be understood that the description set forth herein is merely exemplary and illustrative of the disclosed embodiments and is not intended to limit the scope of the invention as defined solely by the claims.

In the present disclosure, other than where otherwise indicated, all numbers expressing quantities or characteristics are to be understood as being prefaced and modified in all instances by the term "about." Accordingly, unless indicated to the contrary, any numerical parameters set forth in the following description may vary depending on the desired properties one seeks to obtain in the embodiments according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10. Any maximum numerical limitation recited herein is intended to include all lower numerical limitations subsumed therein and any minimum numerical limitation recited herein is intended to include all higher numerical limitations subsumed therein. Accordingly, Applicant reserves the right to amend the present disclosure, including the claims, to expressly recite any sub-range subsumed within the ranges expressly recited herein. All such ranges are intended to be inherently disclosed herein such that amending to expressly recite any such sub-ranges would comply with the requirements of 35 U.S.C. .sctn.112, first paragraph, and 35 U.S.C. .sctn.132(a).

The grammatical articles "one", "a", "an", and "the", as used herein, are intended to include "at least one" or "one or more", unless otherwise indicated. Thus, the articles are used herein to refer to one or more than one (i.e., to at least one) of the grammatical objects of the article. By way of example, "a component" means one or more components, and thus, possibly, more than one component is contemplated and may be employed or used in an implementation of the described embodiments.

Any patent, publication, or other disclosure material, in whole or in part, that is said to be incorporated by reference herein, is incorporated herein in its entirety, but only to the extent that the incorporated material does not conflict with existing definitions, statements, or other disclosure material expressly set forth in this disclosure. As such, and to the extent necessary, the express disclosure as set forth herein supersedes any conflicting material incorporated herein by reference. Any material, or portion thereof, that is said to be incorporated by reference herein, but which conflicts with existing definitions, statements, or other disclosure material set forth herein is only incorporated to the extent that no conflict arises between that incorporated material and the existing disclosure material.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A rolling vehicle track, comprising:
a first wall and a second wall opposite to each other, each of the first wall and the second wall positioned between and connected to a third wall and a fourth wall that are opposite and parallel to each other;
a bracket having a first bracket portion, a second bracket portion, a third bracket portion, and a fourth bracket portion, the first bracket portion connected to the third wall and parallel to each other, and the fourth bracket portion connected to the first wall and parallel to each other;
the first wall, the second wall, the third wall, and the fourth wall defining a first quadrilateral chamber; and
the first bracket portion, the second bracket portion, the third bracket portion, and the first wall defining a second quadrilateral chamber;
wherein the first wall, the second wall, the third wall, the fourth wall, and the bracket are interconnected without welding.

2. The rolling vehicle track of claim 1 further comprises a first strip connected to the third bracket portion to provide a surface for a wheel of a rolling vehicle to engage thereof.

3. The rolling vehicle track of claim 2 further comprises a third strip positioned between the first strip and the third bracket portion.

4. The rolling vehicle track of claim 1 further comprises a second strip connected to the second bracket portion to provide a surface for a wheel of a rolling vehicle to engage thereof.

5. The rolling vehicle track of claim 3 further comprises a fourth strip positioned between the second strip and the second bracket portion.

6. The rolling vehicle track of claim 1, wherein the first wall and the second wall of the first quadrilateral chamber are nonparallel.

7. The rolling vehicle track of claim 1, wherein the first wall and the second bracket portion of the second quadrilateral chamber are nonparallel.

8. The rolling vehicle track of claim 1, wherein a distance between an end of the first wall and an end of the second wall in close proximity to the third wall is greater than a distance between an end of the first wall and an end of the second wall in close proximity to the fourth wall.

9. The rolling vehicle track of claim 1, wherein a distance between an end of the first wall and an end of the second wall in close proximity of the third wall is less than a distance between an end of the first wall and an end of the second wall in close proximity to the fourth wall.

10. The rolling vehicle track of claim 1, wherein the first wall, the second wall, the third wall, the fourth wall, and the bracket are interconnected with mechanical fasteners.

11. The rolling vehicle track of claim 1, wherein the first quadrilateral defines a rectangle.

12. The rolling vehicle track of claim 1, wherein the second quadrilateral defines a rectangle.

13. The rolling vehicle track of claim 1 further comprises a boot for connecting a wood portion of the rolling vehicle track to a non-wood portion of the rolling vehicle track.

14. The rolling vehicle track of claim 1, wherein the first wall and the second wall each includes a plurality of opposed tabs extending at respective ends of the first wall and the second wall.

15. The rolling vehicle track of claim 14, wherein one of the tabs of the first wall is adjacent to an end of the first bracket portion forming a coplanar structure.

16. A rolling vehicle track, comprising:
a first wall and a second wall opposite to each other, each of the first wall and the second wall positioned between and connected to a third wall and a fourth wall that are opposite and parallel to each other;
a bracket having a first bracket portion, a second bracket portion, a third bracket portion, and a fourth bracket portion, the first bracket portion connected to the third wall and parallel to each other, and the fourth bracket portion connected to the first wall and parallel to each other;

the first wall, the second wall, the third wall, and the fourth wall defining a first quadrilateral chamber;

the first bracket portion, the second bracket portion, the third bracket portion, and the first wall defining a second quadrilateral chamber;

a first strip connected to the third wall;

a second strip connected to the second bracket portion;

a third strip connected to the third bracket portion; and wherein the first wall, the second wall, the third wall, the fourth wall, the bracket, the first strip, the second strip, and the third strip are interconnected without welding.

17. The rolling vehicle track of claim 16, wherein the first wall and the second wall of the first quadrilateral chamber are nonparallel.

18. The rolling vehicle track of claim 16, wherein the first wall and the second bracket portion of the second quadrilateral chamber are nonparallel.

19. The rolling vehicle track of claim 16, wherein a distance between an end of the first wall and an end of the second wall in close proximity to the third wall is greater than a distance between an end of the first wall and an end of the second wall in close proximity to the fourth wall.

20. The rolling vehicle track of claim 16, wherein a distance between an end of the first wall and an end of the second wall in close proximity of the third wall is less than a distance between an end of the first wall and an end of the second wall in close proximity to the fourth wall.

21. The rolling vehicle track of claim 16, wherein the first quadrilateral defines a rectangle.

22. The rolling vehicle track of claim 16, wherein the second quadrilateral defines a rectangle.

23. The rolling vehicle track of claim 16 further comprises a boot for connecting a wood portion of the rolling vehicle track to a non-wood portion of the rolling vehicle track.

24. A rolling vehicle track, comprising:

a first wall including a plurality of opposed tabs and a second wall opposite to the first wall and including a plurality of opposed tabs, each of the first wall and the second wall positioned between and connected to a third wall and a fourth wall that are opposite and parallel to each other, wherein one of the tabs of the first wall is attached to the third wall and the other tab of the first wall is attached to the fourth wall, wherein one of the tabs of the second wall is attached to the third wall and the other tab of the second wall is attached to the fourth wall; and a bracket having a first bracket portion, a second bracket portion, a third bracket portion, and a fourth bracket portion, the first bracket portion connected to the third wall and parallel to each other, and the fourth bracket portion connected to the first wall and parallel to each other, wherein the first wall, the second wall, the third wall, the fourth wall, and the bracket are interconnected without welding.

* * * * *